United States Patent [19]

Donkin

[11] Patent Number: 4,555,189
[45] Date of Patent: Nov. 26, 1985

[54] WINCHESTER DISC DRIVE

[75] Inventor: Charles W. Donkin, Falkland, Scotland

[73] Assignee: Burroughs Corporation, Detroit, Mich.

[21] Appl. No.: 444,126

[22] Filed: Nov. 23, 1982

[51] Int. Cl.[4] .................. F16C 33/04; F16C 23/08; F16C 27/08
[52] U.S. Cl. ................................. 384/493; 384/495; 384/500; 384/535
[58] Field of Search ........... 308/176, 183, 188, 189 R, 308/189 A, 197, 236, 6 B, 184 A, DIG. 14; 464/139, 142, 143; 384/493, 495, 500, 535

[56] References Cited

U.S. PATENT DOCUMENTS

| | | | |
|---|---|---|---|
| 2,221,176 | 11/1940 | Boll | 308/176 X |
| 2,819,127 | 1/1958 | Grobey | 308/183 |
| 3,061,822 | 10/1962 | Mitchell | 308/176 X |
| 3,490,251 | 1/1970 | Roethlisberger | 308/176 X |
| 3,945,694 | 3/1976 | Vaillette | 308/183 X |

FOREIGN PATENT DOCUMENTS

| | | | |
|---|---|---|---|
| 848057 | 9/1952 | Fed. Rep. of Germany | 308/189 A |
| 1031577 | 6/1966 | United Kingdom | |

Primary Examiner—Stuart S. Levy
Assistant Examiner—Thomas R. Hannon
Attorney, Agent, or Firm—Mark T. Starr; Kevin R. Peterson

[57] ABSTRACT

A rotary actuator assembly, for use as part of a servomechanism for positioning one or more data recording or data recovering heads over selectable data storage tracks at selectable radii on one or more rotary data storage discs, comprises a head support arm pivoted to rotate with a shaft held betwen two bearings in a yoke, where one of the bearings is a composite bearing allowing both axial and rotational movement of the shaft and the other bearing allows only rotational movement of the shaft, the two bearings co-operating to fix the position of the shaft while allowing its free rotation and allowing axial movement of the shaft whenever axial force exceeds a predetermined limit, thereby preventing undue bearing play or bearing binding attendant upon prior art designs.

3 Claims, 8 Drawing Figures

WINCHESTER DISC DRIVE

BACKGROUND OF THE INVENTION

1. Field of the Invention

The present invention relates to a method and apparatus for constraining a shaft to rotate about an axis when held between two bearings. It further relates to such a method and apparatus where it is required to control the rotation-opposing friction despite variations imposed in bearing load due to thermal and other dimensional changes in the equipment. The invention is particularly useful for mounting rotary head positoning actuators in Winchester style disc drives for their rotation about the axis of a shaft to position one or more data recording or data recovering heads at selectable radii on rotating data storage discs.

While the invention is hereinafter described in relation to such an application within a Winchester disc drive, such application is not intended as a limitation to its utility.

2. The Prior Art

A winchester style disc drive comprises a base whereon one or more discs are restrained to rotate on a spindle and whereon a rotary actuator is mounted, the actuator comprising a head mounting arm rotatable about an axis to position a head or heads for data storage or recovery at selectable radii on the disc or discs.

The rotary actuator in general comprises a yoke having bearings mounted into the opposite faces thereof for the rotation of a shaft passing therethrough, the head arm being keyed to or integral with the shaft. It is general that the shaft is an interference fit in the bearing and the bearing is an interference fit within its particular face of the yoke.

During assembly of the yoke and shaft with the bearings, because of the frictional, transition fit of the various parts it is difficult to control the residual force directed along the axis of the shaft as the bearing load. Similarly, when the assembly is subjected to change in temperature, the relative expansion and contraction between the shaft and the yoke can set up very large bearing loads. As bearing load increase, so the amount of torque required to turn the shaft about its axis becomes greater. In the case of the rotary actuator in a Winchester disc drive, the increasing torque is reflected in an increasing positioning error for the heads as the friction encountered by the head positioning servo-mechanism of which the actuator forms part rises. When the friction exceeds a critical limit the head position error induces data corruption so that recorded data cannot be recovered or new data is written unwantedly and destructively in the position of data it was desired to retain. The difficulty in controlling residual bearing loads makes it difficult to predict when an assembly is liable to exceed the critical limit and it is perfectly and distressingly possible to manufacture an assembly which passes all tests only to fail after delivery to a customer.

The bearings for the actuator shaft must be precise. There are many hundreds of data storage tracks per radial centimeter on the disc of a Winchester drive, and the accuracy of positioning must be such that the head or heads can be positioned to intercept a selectable one of them. The amount of play in the bearings is correspondingly small and preferably zero, making the takeup of stress or thermally induced dimensional changes by residual play an impractical proposition. It is not possible to deliberately make the transition fits of poor frictional quality, since this would allow the shaft to slip during shipping or working life of the drive and render the actuator inoperable. As an added disadvantage, the precision of the dimensions required to provide a transition fit of controlled friction is such as to render cost prohibitive.

It is therefore desirable to provide a method and apparatus for the mounting of a shaft between two bearings in a yoke where the shaft is free to rotate about an axis with less than a predetermined amount of frictional torque despite thermal expansion and assembly tolerances and with substantially no play in a transverse or longitudinal direction relatively to said axis.

SUMMARY OF THE INVENTION

The present invention consists in a method and apparatus for mounting a shaft for rotation about an axis and for the location of said shaft in the direction of said axis, said apparatus comprising; a first rotary bearing concentrically affixed to a first location on said shaft for attaching said shaft to a first location on a support member, a second rotary bearing concentrically affixed to a second location on said shaft, and a longitudinal rolling bearing affixed to a second location on said support member and concentrically affixed to said second rotary bearing for allowing said second rotary bearing to move in the direction of said axis whenever a predetermined axial force is exceeded.

BRIEF DESCRIPTION OF THE PREFERRED EMBODIMENT

In a preferred embodiment an actuator for positioning a plurality of preferably magnetic data recording and/or recovering heads radially over one or more discs in a disc data store comprises a head support arm on a shaft constrained within a yoke by a composite float bearing and a rotary bearing set into first and second faces of said yoke respectively. The rotary bearing is preferably affixed to the shaft so that the shaft cannot move with respect thereto and the rotary bearing is preferbly affixed in the second face of said yoke so as to be immovable with respect thereto, thereby positively locating the shaft with respect to the second face of the yoke.

The composite bearing preferably permits rotation of the shaft about its axis together with movement of the shaft in the direction of the axis. Movement of the shaft in the direction of the axis preferably occurs if and only if a predetermined axial force is exceeded.

The rotary bearing is preferably a ball or roller bearing.

The composite bearing preferably comprises a composite rotary bearing and a composite axial bearing mutually co-operative for the movement of the shaft. The composite rotary and axial bearings are preferably mutually supportive for coupling said shaft to the first face of the yoke. The axial bearing is preferably affixed to the first face of the yoke and the composite rotary bearing is preferably concentrically affixed to the shaft, the axial bearing preferably being affixed to the composite rotary bearing for its support.

The axial bearing is preferably a rolling bearing, in which case it is preferably circular and preferably comprises an outer ring for attachment to the first face of said yoke, an inner ring for attachment to the outer perimeter of the composite rotary bearing, and a plurality of rolling balls interposed therebetween. The balls have an uncompressed diameter a little greater than the space allotted to them between said inner and outer rings to generate a force by mutual compression tending to maintain the inner and outer rings immobile relatively to one another unless a predetermined axial force is exceeded.

The outer ring preferably comprises an outer ring lip extensive towards said balls and the inner ring preferably comprises an inner ring lip also extensive towards said balls such that movement between said inner and outer rings is restrained from exceeding a predetermined limit by said lips trapping one or more of said balls therebetween.

Said lips can be formed, in one variation over the preferred embodiment, by the inclusion of first and second spring clips in the construction of the axial bearing, the first spring clip expanding outwards to the first face of the yoke and overhanging the space between the rings, and the second spring clip contracting onto the outer perimeter of the composite rotary bearing and also overhanging the space between the rings, but on the opposite end of the axial bearing, the variation also preferably including the use of third and fourth spring clips in the same manner as the use of the first and second spring clips respectively for forming an effective second set of lips for restraining movement of the inner relative to the outer ring beyond a second limit.

In another variation over the preferred embodiment, the balls are set into recesses in the inner or the outer rings or both. The recesses preferably can comprise a limit for restraining the excursion of the balls therebeyond.

The plurality of balls preferably comprises three or more balls.

BRIEF DESCRIPTION OF THE DRAWINGS

The instant invention is further explained, by way of an example, by the following description together with the appended drawings, in which.

DETAILED DESCRIPTION OF THE PREFERRED EMBODIMENT

Figure 1:
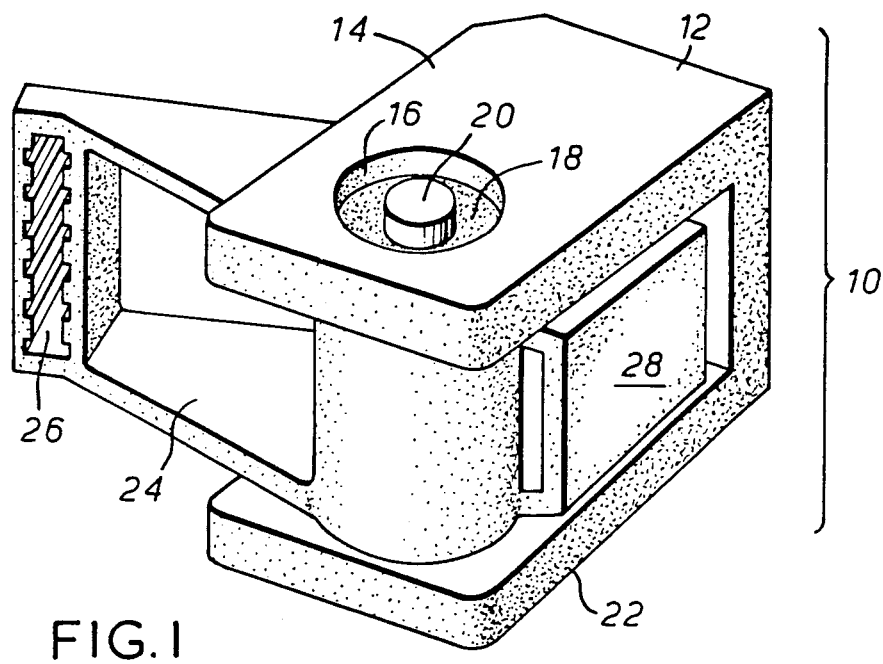
FIG. 1 is an isometric view of an actuator for a disc drive employing the present invention.

FIG. 1 shows an actuator assembly 10 for positioning read/write magnetic heads in a Winchester style disc drive.

The assembly 10 comprises a yoke 12. The top face 14 of the yoke 12 has a circular aperture 16 cut therein and a composite bearing 18 set therein. The composite bearing 18 supports a shaft 20 in a manner to be described.

The bottom face 22 of the yoke 12 is affixed to the base of the disc drive (not shown), which base also supports a spindle whereon a plurality of magnetic data storage discs are rotated. The bottom face 22 supports a further bearing as will be described.

A head arm structure 24 is pivoted on the shaft 20 for radially positioning a plurality of read/write heads over the discs, the heads being held in a head-mounting bracket 26 at the distal end of the arm 24. The arm assembly 24 also includes a mounting face 28 for receiving the magnetic actuator which drives the arm assembly 24.

Figure 2:
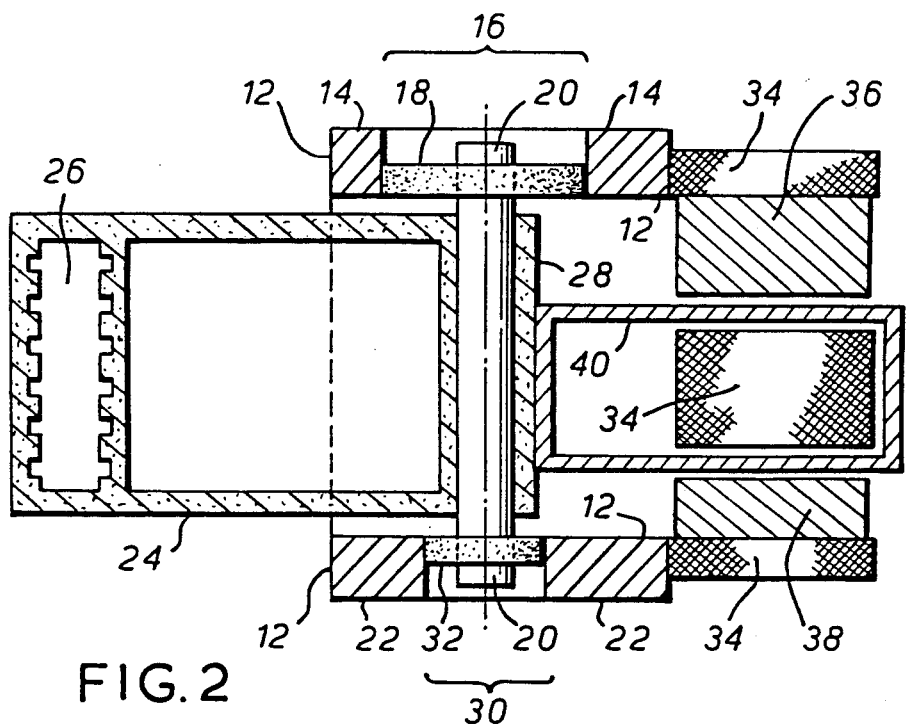
FIG. 2 is a cross-sectional view of the actuator of FIG. 1 including the motive elements thereof.

FIG. 2 shows a cross-sectional view of the actuator assembly 10 of FIG. 1 and further shows the motive elements associated therewith.

The lower face 22 of the yoke 12 comprises a lower circular aperture 30 wherein a rotary bearing 32 is transition fitted and wherein the shaft 20 is transition fitted such that the rotary bearing 32, which can be any ball or roll bearing known in the art, allows the shaft 20 to rotate about its axis but does not allow movement by the shaft 20 in the direction of the axis relative to the lower face 22.

A three-prong magnetic yoke 34 is affixed to the rear of the main yoke 12 to provide a magnetic circuit for the flux from first and second magnets 36, 38 for concentration of the flux in the gaps therebetween, wherein a coil assembly 40, affixed to the rear face 28 of the arm 24, is free to move and to exert a turning torque on the arm 24 in respose to externally supplied electric current.

The actuator assembly 10 forms part of a head positioning servomechanism, the feedback signals for the servomechanism being derived from an associated transducer affixed to rotate with the arm 24 or from servo signals recorded on the disc or discs and recovered and decoded by interception via one or more of the heads.

Figure 3:
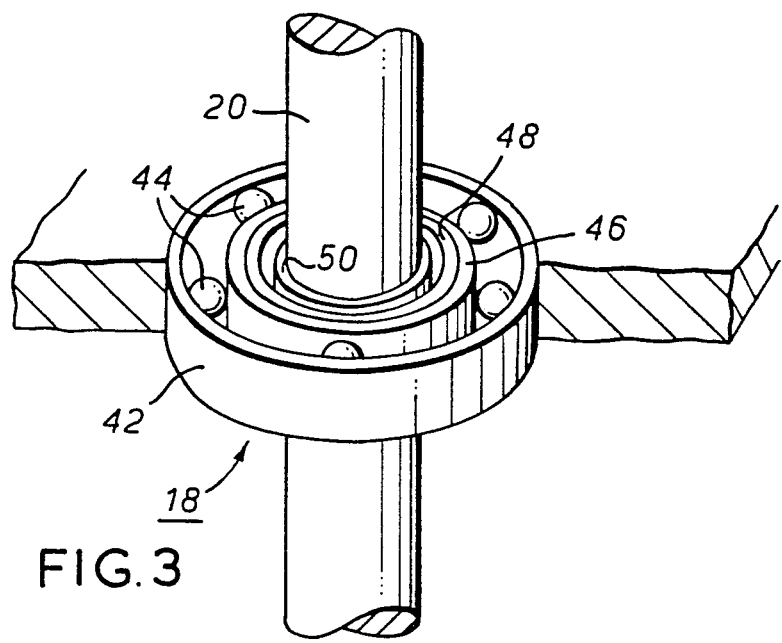
FIG. 3 is an isometric view of a composite bearing according to the preferred embodiment of the present invention.

FIG. 3 shows an isometric view of the composite bearing 18 also illustrated in FIGS. 1 and 2.

The composite bearing 18 is interference fitted into the circular opening 16 in the top face 14 of the yoke 12. The composite bearing 18 comprises an outer axial ring 42 for the transition fitting with the top face 14 as described. A plurality of balls, preferably steel or some other durable and resilient material 44, lie between the outer axial ring 42 and an inner axial ring 46. The inner axial ring 46 is free to move in the direction of the axis of the shaft 20 relatively to the outer axial ring 42 under the action of the balls 44 rolling therebetween.

The balls 44 are slightly outsize, so that their diameter is slightly greater than the clearance they are provided with between the outer axial ring 42 and the inner axial ring 46. When the balls 44 are inserted between the rings 42, 46 the material of the balls 44 and of the rings 42, 46 is subjected to mechanical stress which provides elastic reaction forces preventing the movement of the inner axial ring 46 relatively to the outer axial ring 42 until a predetermined force in the direction of the axis of the shaft 20 has been exceeded.

The inner axial ring is interference fitted onto the outer race 48 of a roller or ball bearing rotary bearing. An inner race 50 is interference fitted onto the shaft 20 and roller or ball bearings supplied in a manner well known in the art between the inner and outer races 50, 48 to provide a bearing for the rotation of the shaft 20 about its axis.

Figure 4:
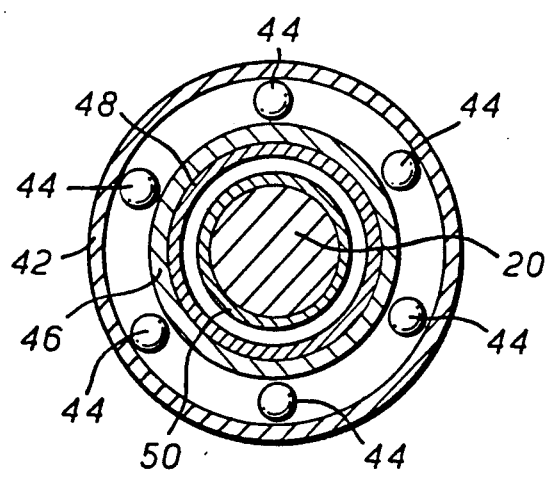
FIG. 4 is a plan cross-sectional view of the composite bearing of FIG. 3.

FIG. 4 shows a plan cross-sectional view of the composite bearing 18 of FIGS. 1 to 3. While there are a total of 6 balls shown in FIG. 4 it is to be appreciated that any system with three or more balls equispaced around the shaft 20 works according to the present invention. The balls 44 can be constrained within a cage as is normal in the design of ball bearing assemblies. FIG. 4 should be considered together with the description associated with FIG. 3 given above.

Figure 5:
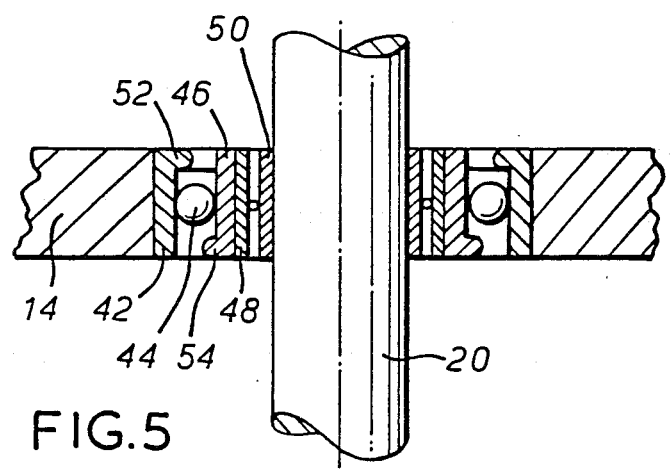
FIG. 5 is an axially transverse cross-sectional view of the composite bearing of FIGS. 3 and 4.

FIG. 5 shows a transverse axial cross-sectional view of the composite bearing assembly 18 also shown in FIGS. 1, 2, 3 and 4.

In addition to the elements already described, FIG. 5 shows an outer lip 52 on the outer side of the yoke 12 affixed to the outer axial ring 42 to overhang the balls 44. An inner lip 54 is affixed on the inner side of the yoke 12 to the inner axial ring 46 also to overhang the balls 44. Should excessive axial movement occur, the outer lip 52 will engage the top of the balls 44, the inner lip 54 will engage the bottom of the balls 44, and the trapping of the balls 44 between the two 52, 54 prevent more than a predetermined amount of relative movement.

Those skilled in the art will readily appreciate that whereas the outer axial ring 42 is described as being interference fitted in the top face 14 of the yoke 12, it can be affixed thereto in any other manner known in the art, inclusively of glue, restraining cover plates and the machining of the outer axial ring 42 as an integral part of the top face 14 of the yoke 12.

It will also be appreciated that whereas the inner axial ring 46 is shown and described as being interference fitted on the outer race 48 it can be affixed thereto in any manner known in the art. Similarly the attachment of the inner race 50 to the shaft 20 can be in any known manner, inclusively of machining the inner race 50 as an integral part of the shaft 20.

The description of the composite bearing 18 and the drawings thereof have indicated that the axially mobile portion thereof 42, 44, 46 is interposed supportively between the top face 14 of the yoke 12 and the rotationally mobile portions 48, 50. Those skilled in the art will appreciate how, with small modification to the description and drawings, the rotary portion 48, 50 can be made to engage the upper face 14 of the yoke 12 and the axially mobile portion 42, 44, 46 can be made to engage the shaft 20.

Whereas the balls 44 have been shown angularly equispaced about the axis of the shaft 20, it will be appreciated that many variants of the present invention can be created wherein the balls 44 are not so equispaced.

As the shaft 20 and the yoke 12 mutually expand and contract, the expansion, which, in the prior art would have been accompanied by excessive bearing loads leading to undue rotation-opposing friction, is dissipated in movement between the inner and outer axial rings 46, 42 whenever the axial force exceeds the predetermined limit set down by the tight fit of the balls 44 between the rings 46, 42. The control of the axial force leads to control of the rotation opposing torque and consequent limitation of that torque to below a predetermined limit.

The tight fit of the balls 44 between the rings 42, 46 means that the rotation of the shaft 20 is entirely accommodated by the rotary portion 48, 50 of the composite bearing 18 whose friction is much less. The non-rotation of the axial portion 42, 44, 46 minimizes wear therein and ensures stability of its friction parameter.

Figure 6:
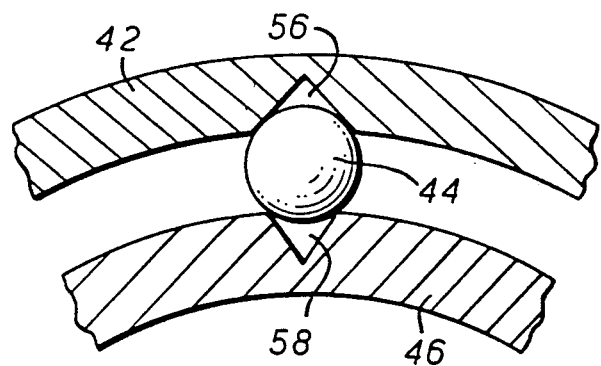
FIG. 6 illustrates the use of recesses to locate the balls between the inner and outer rings of the axial bearing.

FIG. 6 shows a variant over the preferred embodiment as so far described.

A first recess 56 is set into the inside face of the outer axial ring 42. A second recess 58 is set into the inside face of the inner axial ring 46. The first and second recesses 56, 58 are angularly aligned about the shaft 20 so that an outsize ball 44 can rest simultaneously in both recesses 56, 58. The presence of the ball 44 in both recesses 56, 58 prevents mutual rotation of the inner and outer axial rings 46, 42 and the selection of the internal profile of the recesses 56 58 allows for selection of the magnitude of the force separating the inner and outer rings 46, 42 from elastic deformation thereof.

Those skilled in the art will appreciate that the separation force controlling aspect of the recesses 56, 58 can be achieved using a recess in only one of the inner or outer axial rings 46,42. It will also be appreciated that schemes usng mutually interactive sets of vanes and lugs on the inner and outer axial rings 46,42 can be used to inhibit mutual rotation therebetween by their engagement in the event of excessive mutual rotation.

Figure 7:
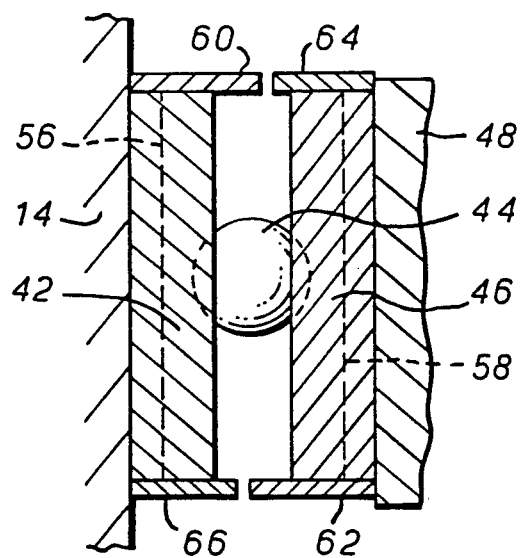
FIG. 7 further illustrate the recesses of FIG. 6 and illustrates the use of spring clips for defining excursion limits for the inner and outer rings.

FIG. 7 shows a further variation over the preferred embodiment as so far described.

The upper lip 52 of FIG. 5 is replaced by an expanding spring clip 60 such as a CIRCLIP TM which expands within the aperture 16 in the top face 14 of the yoke 12 to be restrained thereby and to provide an overhang into the space between the outer and inner axial rings, 42, 46. The lower lip 54 of FIG. 5 is replaced by a contractile, circular spring clip 62 which contracts onto the outer race and also provides an overhang into the space between the inner and outer axial rings 46, 42. The substitute lips so formed operate in the same manner as the lips 52, 54 of FIG. 5. A second expanding spring clip 66 is incorporated onto the other end of the outer axial ring 42 to the first expanding spring clip 60, in the same manner as the first expanding spring clip 60. A second contractile spring clip 64 is incorporated onto the opposite end of the inner axial ring 46 from the first contractile spring clip 62 and in the same manner as the first contractile spring clip 62. The second expanding spring clip 66 and the second contractile spring clip 64 co-operate in the same manner as the first expanding spring clip 60 and the first contractile spring clip 62 but in the opposite direction to define a second limit of mutual movement between the inner and outer axial rings 46, 42.

Those skilled in the art will readily appreciate that a set of spring clips as described 60, 62 or 66, 64 can be used in co-operation with the lips 52, 54 of FIG. 5 or can be used to substitute one or other of the lips 52 54. The spring clips 60 62, 64, 66 can also be employed as part of the mechanical assembly of the composite bearing 18 to provide some or all of the force required to attach the outer axial ring 42 to the upper face 14 of the yoke 12 and to attach the outer race 48 to the inner axial ring 46.

Figure 8:
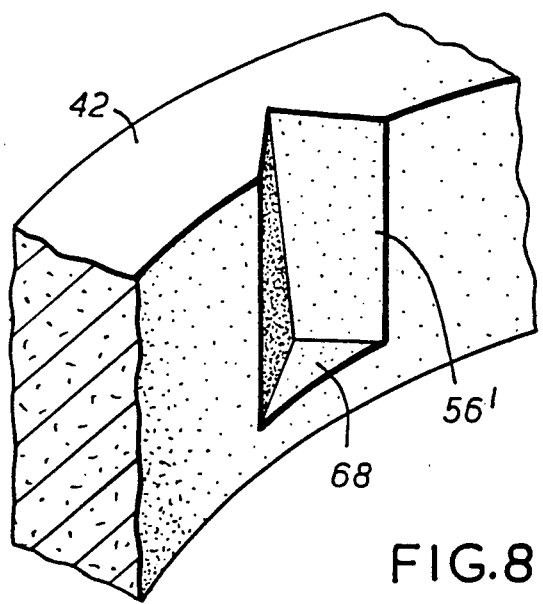
FIG. 8 illustrates a truncated recess for defining an excursion limit.

FIG. 8 shows a variation over the recesses 56, 58 of FIGS. 6 and 7 so far described and shows a variation over the movement retraints 52,54,60,62,64,66.

Instead of extending for the whole depth of the outer axial ring 42 a modified recess 56' extends only part of the way terminating in a lower face 68. The ball 44 cannot pass the lower face and the lower face 68 therefore acts as a first part of a movement restraint for restricting the mutual movement between the inner and outer axial rings 46,42. The lower surface 68 can be used in conjunction with a lip 52,54 or a spring clip 60,62,64,66 to complete the movement restraint. The recess 56' is shown only in the outer axial ring 42. It is to be appreciated that a modified recess can equally be incorporated into the inner axial ring 46. A pair of recesses in the inner and outer rings 46,42 respectively can be opposed so that their lower surfaces 68 come together to trap the ball 44 therebetween.

What I claim is:

1. In apparatus including a head-positioning actuator in a disc data store, a shaft for supporting the head-positioning actuator, a yoke for supporting the shaft, and a first rotary bearing mounted in said yoke and surrounding said shaft at a first location to allow said shaft rotate about an axis, the improvement comprising:

a removable composite bearing assembly mounting in said yoke at a second location to allow rotation of said shaft about said axis and allowing axial movement of said shaft along said axis, said composite bearing assembly being self-contained to include a second rotary bearing and an axial bearing, said second rotary bearing surrounding said shaft to allow rotation about said axis at said second location, said axial bearing mounted in said yoke and surrounding said second rotary bearing, said axial bearing having an outer axial ring and an inner axial ring with bearings in between, both said outer axial ring and said inner axial ring having stops to contain said bearings, said stops being separated by free space to allow free movement of said bearings along said axis between said stops, said outer ring mounted on said yoke and said inner ring surrounding said second rotary bearing, said axial movement of said bearings allowing said inner axial ring, said second rotary bearing, and said shaft to move along said axis;

wherein said outer axial ring comprises a plurality of axially-extensive outer recesses on the face thereof intermediate between said inner and said outer rings, wherein said inner axial ring comprises a corresponding plurality of axially-extensive inner recesses on the face thereof intermediate between said inner and said outer rings and wherein said plurality of balls are held between pairs of said outer recesses and said inner recesses whereby said outer and said inner axial rings are permitted mutual axial movement but are denied mutual rotational movement; and wherein said first outer axial stop is an end wall in at least one of said plurality of outer recesses and wherein said first inner axial stop is an end wall in at least one of said plurality of inner recesses.

2. In apparatus including a head-positioning actuator in a disc data store, a shaft for supporting the head-positioning actuator, a yoke for supporting the shaft, and a first rotary bearing mounted in said yoke and surrounding said shaft at a first location to allow said shaft to rotate about an axis, the improvement comprising:

a removable composite bearing assembly mounting in said yoke at a second location to allow rotation of said shaft about said axis and allowing axial movement of said shaft along said axis, said composite bearing assembly being self-contained to include a second rotary bearing and an axial bearing, said second rotary bearing surrounding said shaft to allow rotation about said axis at said second location, said axial bearing mounted in said yoke and surrounding said second rotary bearing, said axial bearing having an outer axial ring and an inner axial ring with bearings in between, both said outer axial ring and said inner axial ring having stops to contain said bearings, said stops being separated by free space to allow free movement of said bearings along said axis between said stops, said outer ring mounted on said yoke and said inner ring surrounding said second rotary bearing, said axial movement of said bearings allowing said inner axial ring, said second rotary bearing, and said shaft to move along said axis;

wherein said outer axial ring comprises a plurality of axially-extensive outer recesses on the face thereof intermediate between said inner and said outer rings, wherein said inner axial ring comprises a corresponding plurality of axially-extensive inner recesses on the face thereof intermediate between said inner and said outer rings and wherein said plurality of balls are held between pairs of said outer recesses and said inner recesses whereby said outer and said inner axial rings are permitted mutual axial movement but are denied mutual rotation movement; and wherein said outer recesses are extensive throughout the entire axial length of said outer axial ring, wherein said inner axial recesses are extensive throughout the entire axial length of said inner axial ring, wherein said first and second outer axial stops comprise first and second outer walls respectively at first and second axial ends of said outer axial ring for the closure of said outer recesses in an axial direction, and wherein said first and second inner axial stops comprises first and second inner axial walls respectively at first and second axial ends of said inner axial ring for the closure of said inner recesses in an axial direction.

3. An apparatus according to claim 2 wherein said first and second outer walls comprise respectively first and second elastically expansive clips held respectively at said first and second axial ends of said outer axial ring and wherein said first and second inner walls comprise respectively first and second elastically contractile clips held respectively at said first and second axial ends of said inner axial ring.

* * * * *